No. 684,252. Patented Oct. 8, 1901.
J. W. HORTH.
PILE CUTTING MACHINE.
(Application filed Mar. 20, 1901.)
(No Model.) 2 Sheets—Sheet 1.
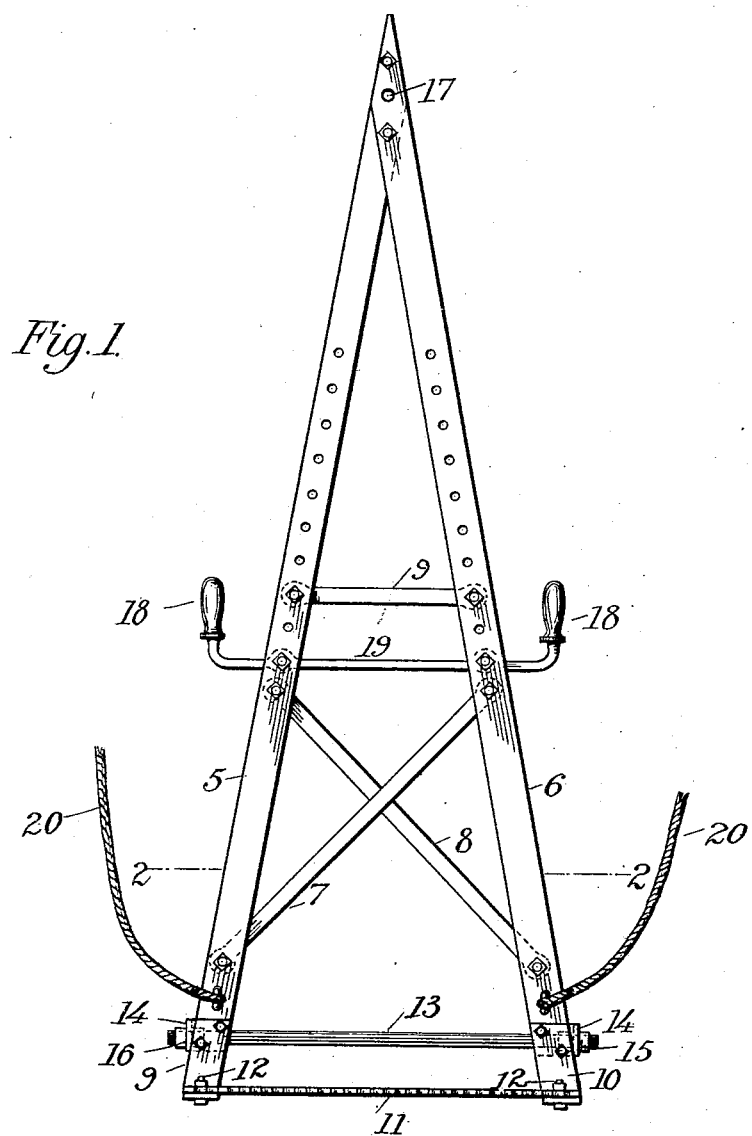
Fig. 1.
Fig. 2.
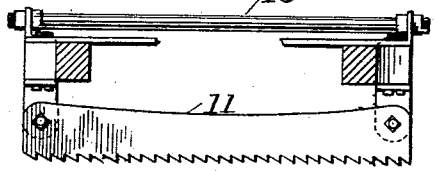
Witnesses: John William Horth, Inventor
by C. A. Snow & Co.
Attorneys No. 684,252. Patented Oct. 8, 1901.
J. W. HORTH.
PILE CUTTING MACHINE.
(Application filed Mar. 20, 1901.)
(No Model.) 2 Sheets—Sheet 2.

Witnesses:
J. S. Bowen,
Geo. H. Chandlee.

John William Horth, Inventor
by C. A. Snow & Co.
Attorneys

UNITED STATES PATENT OFFICE.

JOHN WILLIAM HORTH, OF SALAMANCA, NEW YORK.

PILE-CUTTING MACHINE.

SPECIFICATION forming part of Letters Patent No. 684,252, dated October 8, 1901.

Application filed March 20, 1901. Serial No. 52,075. (No model.)

*To all whom it may concern:*

Be it known that I, JOHN WILLIAM HORTH, a citizen of the United States, residing at Salamanca, in the county of Cattaraugus and State of New York, have invented a new and useful Pile-Cutting Machine, of which the following is a specification.

This invention relates to a machine for sawing off piles while in the water; and it has for its object to provide a simple, cheap, and efficient construction which may be attached to the pile to be cut and which may be then operated to cut the pile either above or below the water, further objects and advantages of the invention being evident from the following description.

Figure 3:
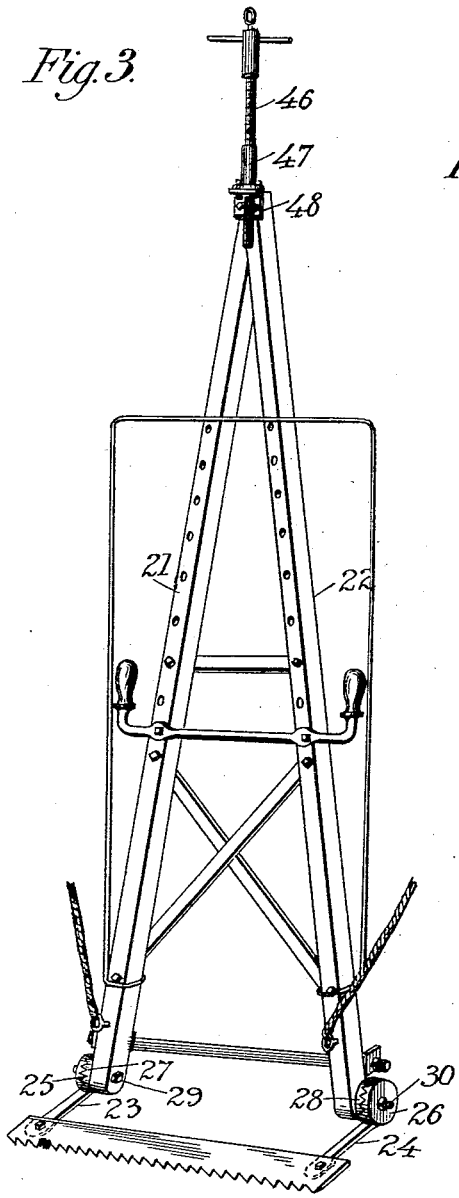
Figure 4:
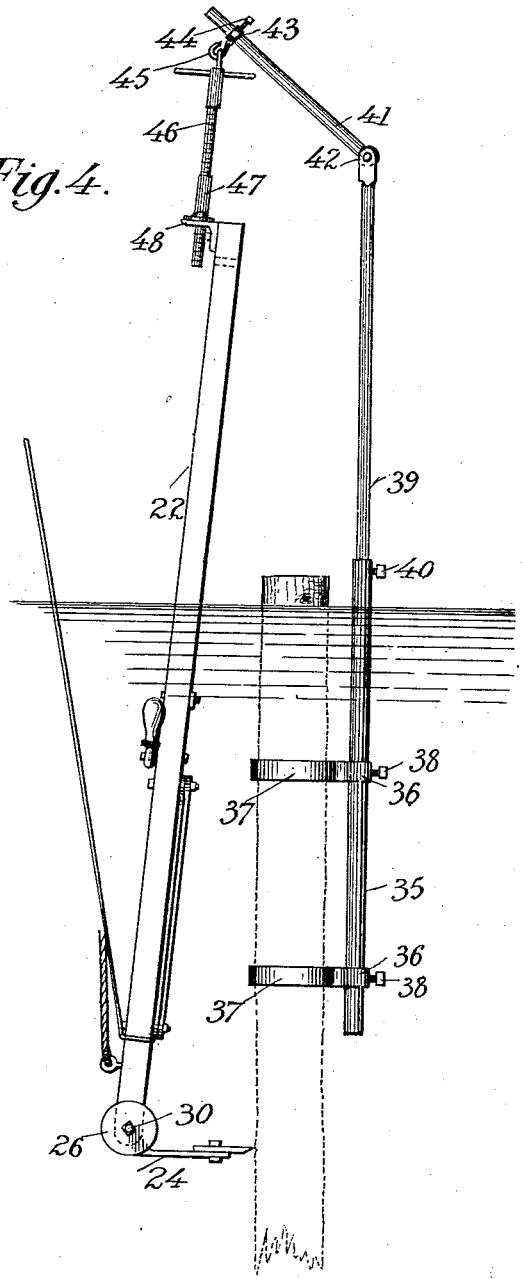

In the drawings forming a portion of this specification, and in which like numerals of reference indicate similar parts in the several views, Figure 1 is a front elevation of one form of saw-frame. Fig. 2 is a section on line 2 2 of Fig. 1. Fig. 3 is a perspective view showing a second form of saw-frame. Fig. 4 is a side elevation showing the supporting-frame for the saw-frame shown in Fig. 3 and with said saw-frame in place.

Referring now to the drawings, and more particularly to Figs. 1 and 2 thereof, there is shown a saw-frame comprising sides 5 and 6, which are connected at their upper ends and which diverge downwardly and adjacent to their lower ends are provided with diagonal braces 7 and 8, an additional brace 9 being connected to the sides thereabove. At the lower ends of the sides 5 and 6 and on the front faces thereof are secured angle-plates 9 and 10, and secured to the upper faces of the feet of these angle-plates is a saw 11, held in place by bolts 12 or in any other suitable manner to permit of application and removal of the saw. After the saw is in place it must be given proper tension, and for this purpose a bar 13 is provided, and the ends thereof are disposed in alining perforations in other angle-plates 14, secured to the rear faces of the sides of the saw-frame, said bar having threaded ends, with which are engaged nuts 15 and 16, the nuts 15 being disposed to impinge against the outer faces of the plates, while the nuts 16 impinge against the inner faces thereof, and by adjusting these nuts the lower ends of the sides of the frame are sprung outwardly to increase the tension of the saw.

Through the overlapping ends of the sides 5 and 6 of the saw-frame is formed a bearing-opening 17, which is adapted to receive a spike driven into the face of the pile to be cut off, the height of the spike determining the point at which the cut will be made, and with the frame thus hung it will be seen that it may be swung to reciprocate the saw across the face of the pile. To thus swing the saw-frame upon its pivot, handles 18 are provided upon the upturned ends of a rod or bar 19, which is disposed transversely of and against the faces of the sides 5 and 6, this bar being held removably in place by bolts engaged with the bar and with perforations in the frame. Perforations are formed through the sides of the frame at different heights, so that the bar may be adjusted to correspond to the depth at which the saw is cutting. When the pile to be cut is too short to permit of pivoting the saw-frame directly thereto, a plank may be spiked to the face of the pile and of sufficient length and the frame pivoted thereto. The handles 18 serve, further, to hold the saw up against the pile, while the actual swinging of the frame is accomplished through the medium of ropes 20, attached to the frame near to the lower ends of its sides and which are of sufficient length to reach to the surface of the water. By drawing first upon one rope and then the other the saw-frame will be swung.

In Figs. 3 and 4 of the drawings there is shown a construction wherein the saw-frame includes the diverging sides 21 and 22, and the saw instead of being mounted rigidly upon the frame is carried by arms 23 and 24, having clutch-drums 25 and 26 at their inner ends, having serrated faces disposed against the serrated faces of clutch-blocks 27 and 28, secured to the sides of the frame. Bolts 29 and 30, passed through the drums and their corresponding blocks, hold the serrated faces in engagement and prevent pivotal movement of the saw-supporting arms. With this construction it will be seen that the saw may be adjusted to various angles to the frame to facilitate operation thereof under conditions to be hereinafter described. Ropes are attached to the saw-frame as in the previouslydescribed structure for rocking the frame, and handles are also attached thereto.

In connection with this saw-frame there is employed a support consisting of a tubular member 35, engaged in sockets 36 upon spaced rings 37, adapted for engagement over the pile to be cut, and which rings are held properly spaced upon said member by set-screws 38. A second member or mast-section 39 is slidably disposed in the tubular section and is held adjustably therein by a set-screw 40. At the top of the member or section 39 is pivoted an arm 41, having a clutch 42 for holding it at different angles to project over the top of a pile to which the support is connected, and mounted slidably upon this arm is a ring 43, held at different points by a set-screw 44 and provided with a hook 45 for engagement with a temper-screw 46, which has threaded engagement with a nut 47, carried by an angle-plate 48, secured to the face of the saw-frame.

Fig. 4 shows the application of the support and frame to a pile to be cut, and it will be understood that if the pile be slanting the arm at the upper end of the support or mast may be further inclined to project farther over the pile, so that the saw-frame may hang approximately vertical.

To guide the saw to position under the water, a frame is provided comprising arms having loops at their ends slidably engaged with the sides of the saw-frame and connected at their upper ends by a web portion forming a handle for the guide.

It will be understood that when a pile is being cut that is inclined the saw must incline also, and to permit it to operate the temper-screw is operated to feed the frame gradually downwardly.

What is claimed is—

1. A device of the class described comprising a saw-supporting frame including side pieces having perforations therein, said frame being constructed for pivotal mounting, handles having attaching-bolts for engagement with corresponding perforations interchangeably, means for attachment of a saw to the side pieces, and means for springing the side pieces to vary the tension of the saw.

2. A device of the class described comprising converging side pieces constructed for pivotal mounting and provided with perforations alining in pairs, handles having attaching-bolts for engagement with the perforations interchangeably, means for attachment of a saw at the divergent ends of the sides, means for springing the sides to vary the tension of the saw, and ropes connected with the sides adjacent to the saw for swinging the frame.

3. A device of the class described comprising a telescopic mast having means for attaching it to a pile and having a pivotally-adjustable arm for projection over the pile, and a saw-supporting frame pivotally connected with the arm.

4. A device of the class described comprising a telescopic mast having means for attachment to a pile and having a pivotally-adjustable arm, a temper-screw, means adjustable slidably of the arm for attachment of the temper-screw thereto, and a saw-supporting frame with which the screw is connected for adjustment of the frame, said screw being pivotally connected with its attaching means.

5. A device of the class described comprising a saw-supporting frame constructed for pivotal mounting and including arms connected for attachment of a saw thereto said arms being adjustably connected to the frame to hold a saw at different angles thereto.

In testimony that I claim the foregoing as my own I have hereto affixed my signature in the presence of two witnesses.

JOHN WILLIAM HORTH.

Witnesses:
CLINTON HORTH,
JAMES B. SWAN.